(12) United States Patent
Banerjee et al.

(10) Patent No.: US 7,076,498 B2
(45) Date of Patent: Jul. 11, 2006

(54) METHOD AND APPARATUS FOR PROCESSING USER INPUT SELECTING IMAGES FROM A WEB PAGE IN A DATA PROCESSING SYSTEM

(75) Inventors: Dwip N. Banerjee, Austin, TX (US); Marilyn Smith Dawkins, Austin, TX (US); Rabindranath Dutta, Los Angeles, CA (US)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 10/165,875

(22) Filed: Jun. 10, 2002

(65) Prior Publication Data

US 2003/0229628 A1 Dec. 11, 2003

(51) Int. Cl.
*G06F 17/30* (2006.01)

(52) U.S. Cl. .................. 707/102; 707/3; 707/104.1; 709/217; 715/738

(58) Field of Classification Search ............ 707/1–10, 707/100–104.1, 200–206; 709/217, 218, 709/219; 715/738, 739, 762
See application file for complete search history.

(56) References Cited

U.S. PATENT DOCUMENTS

| | | | | |
|---|---|---|---|---|
| 5,907,837 A | * | 5/1999 | Ferrel et al. ............... | 707/3 |
| 5,963,940 A | | 10/1999 | Liddy et al. ............... | 707/5 |
| 5,963,964 A | | 10/1999 | Nielsen .................. | 707/501 |
| 6,067,552 A | | 5/2000 | Yu ....................... | 707/501 |
| 6,081,263 A | * | 6/2000 | LeGall et al. ............. | 715/760 |
| 6,119,135 A | | 9/2000 | Helfman ................. | 707/513 |
| 6,222,534 B1 | | 4/2001 | Ohishi et al. ............. | 345/331 |
| 6,253,208 B1 | | 6/2001 | Wittgreffe et al. ......... | 707/104 |
| 6,271,840 B1 | | 8/2001 | Finseth et al. ............ | 345/349 |
| 6,282,547 B1 | | 8/2001 | Hirsch ................... | 707/102 |
| 6,321,227 B1 | | 11/2001 | Ryu ..................... | 707/10 |
| 6,516,321 B1 | * | 2/2003 | De La Huerga ........... | 707/102 |
| 6,701,307 B1 | * | 3/2004 | Himmelstein et al. ....... | 707/3 |

OTHER PUBLICATIONS

IBM Technical Disclosure Bulletin, "Contextual Search for Multimedia Presentation", vol. 37, No. 04A, Apr. 1994, pp. 139–141.

* cited by examiner

*Primary Examiner*—Shahid Alam
*Assistant Examiner*—Jean Bolte Fleurantin
(74) *Attorney, Agent, or Firm*—Duke W. Lee; A. Bruce Clay; James D. Skarsten

(57) ABSTRACT

A method, apparatus, and computer instructions for processing a user input. A user input selecting an image on a page is detected. The image selected by the user input is sent to a server to perform a search in response to detecting the user input. The server performs object recognition analysis on the image to generate a text description of the image. Alternatively, the server may perform an image search for resources with similar images or properties. This text description, which may include one or more words, is used as the basis of the search. A result of the search is received in response to sending the image to the server to form a received result. The received result is displayed. Further, other contextual information associated with the image may be used in addition to or in place of the image in generating the search.

16 Claims, 5 Drawing Sheets

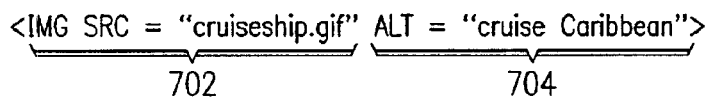
FIG. 7
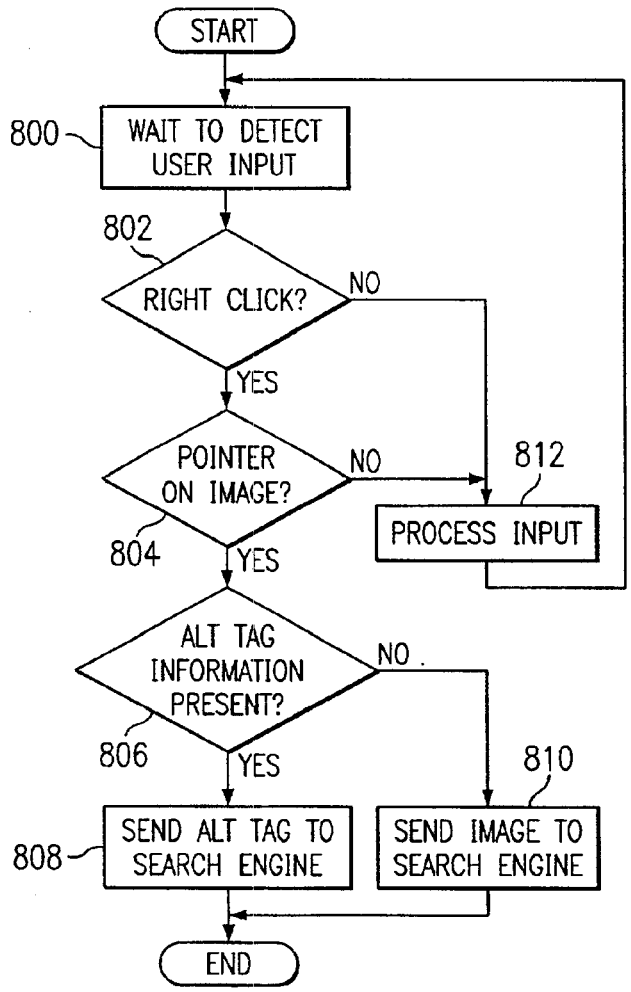
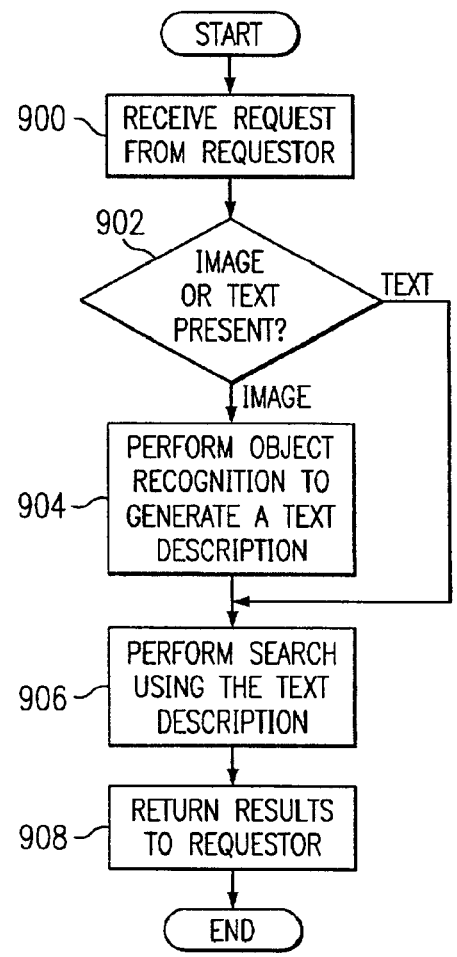

METHOD AND APPARATUS FOR PROCESSING USER INPUT SELECTING IMAGES FROM A WEB PAGE IN A DATA PROCESSING SYSTEM

BACKGROUND OF THE INVENTION

1. Field of the Invention

The present invention relates generally to an improved data processing system, and in particular, to a method and apparatus for processing user input. Still more particularly, the present invention provides a method and apparatus for processing user input selecting images on a page.

2. Background of the Invention:

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML).

In addition to basic presentation formatting, HTML allows developers to specify "links" to other Web resources identified by a uniform resource locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

When a user views a Web page, links to additional information, such as other Web pages, may be presented to the user. These links are typically highlighted words, underlined words, buttons, or other graphical indicators, which are associated with a particular URL. Selection of one of these links causes the information pointed to by the URL to be retrieved.

Further, a user may select a word and have a search performed on that word to find additional information about the word. In some cases, however, a user may be unable to think of a particular word or set of words on which to search for more information. Therefore, it would be advantageous to have an improved method, apparatus, and computer instructions for generating a search request.

SUMMARY OF THE INVENTION

The present invention solves the problem associated with generating searches by allowing a search to be initiated based on the selection of an image. The present invention provides a method, apparatus, and computer instructions for processing a user input. A user input selecting an image on a page is detected. The image selected by the user input is sent to a server to perform a search in response to detecting the user input. The server performs object recognition analysis on the image to generate a text description of the image. Alternatively, the server may perform an image search for resources with similar images or properties. This text description, which may include one or more words, is used as the basis of the search. A result of the search is received in response to sending the image to the server to form a received result. The received result is displayed. Further, other contextual information associated with the image may be used in addition to or in place of the image in generating the search.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is a diagram of contextual information associated with an image in accordance with a preferred embodiment of the present invention;

FIG. 8 is a flowchart of a process used to generate a search request in accordance with a preferred embodiment of the present invention;

FIG. 9 is a flowchart of a process used to generate search results in accordance with a preferred embodiment of the present invention;

DETAILED DESCRIPTION OF THE PREFERRED EMBODIMENT

Figure 1:
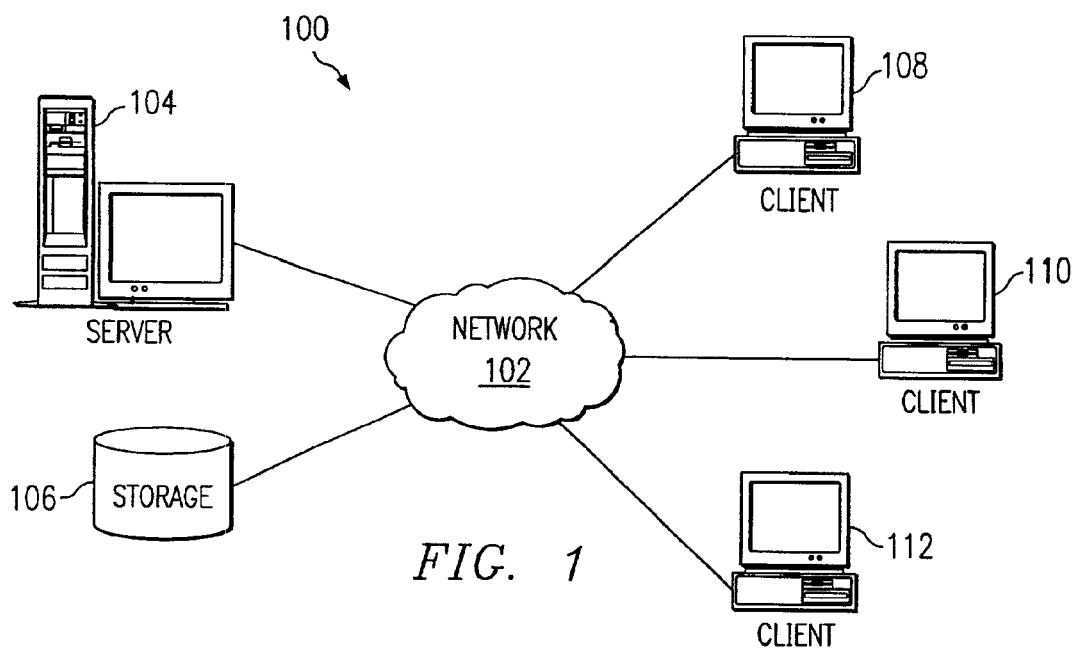
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
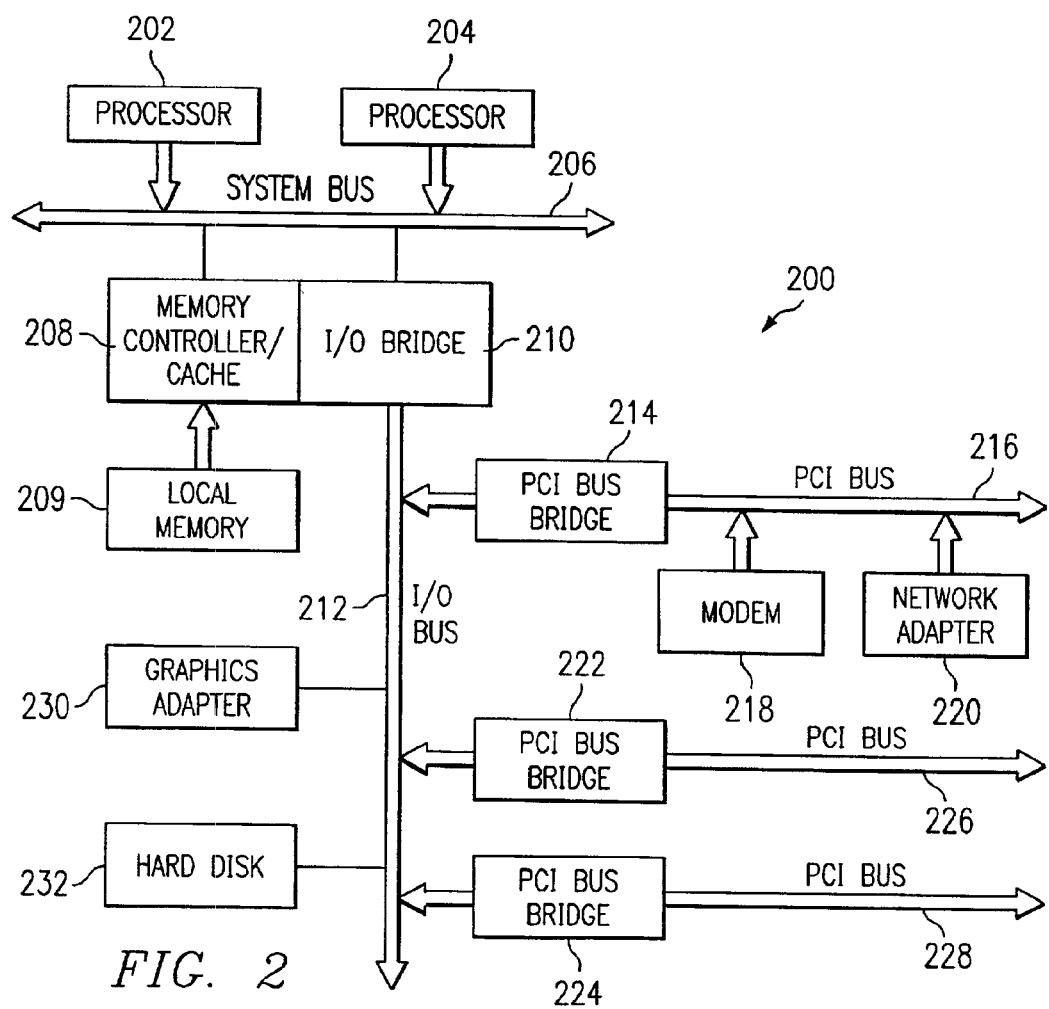
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
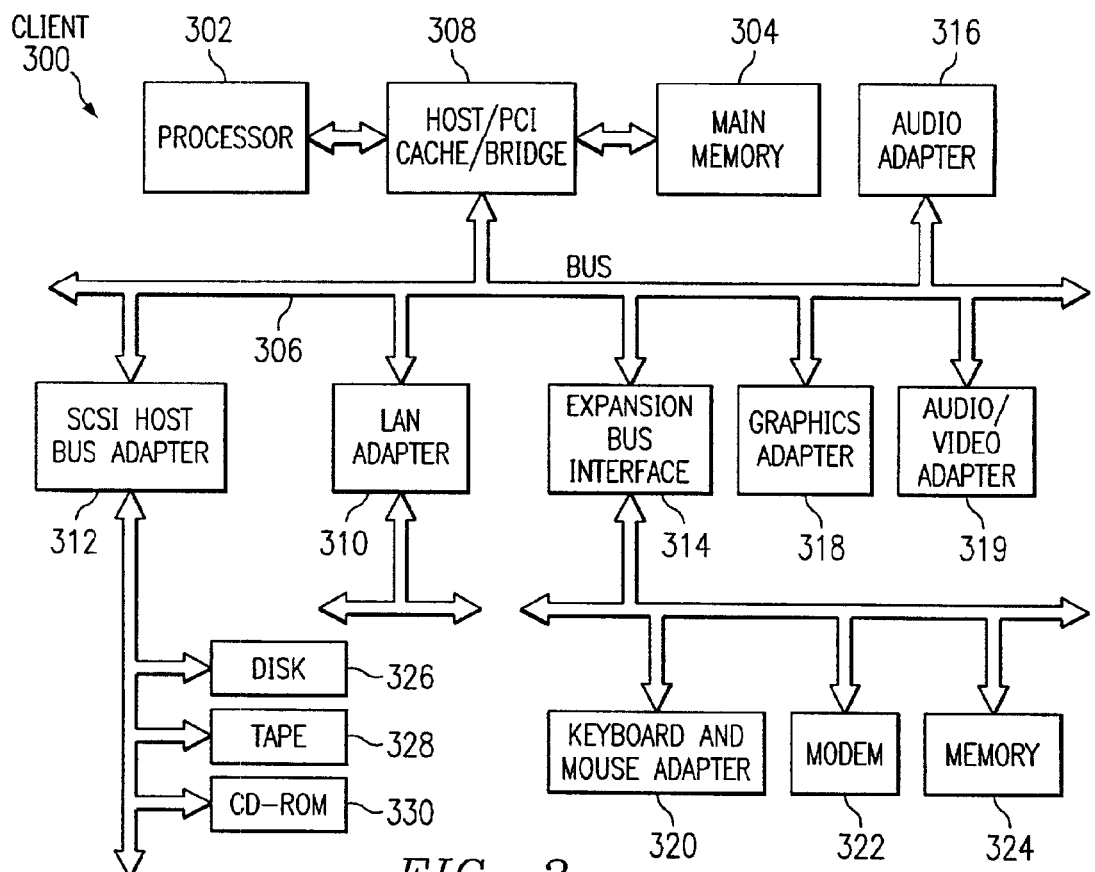
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. Instructions for the operating system and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read only memory (ROM) or equivalent nonvolatile memory or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
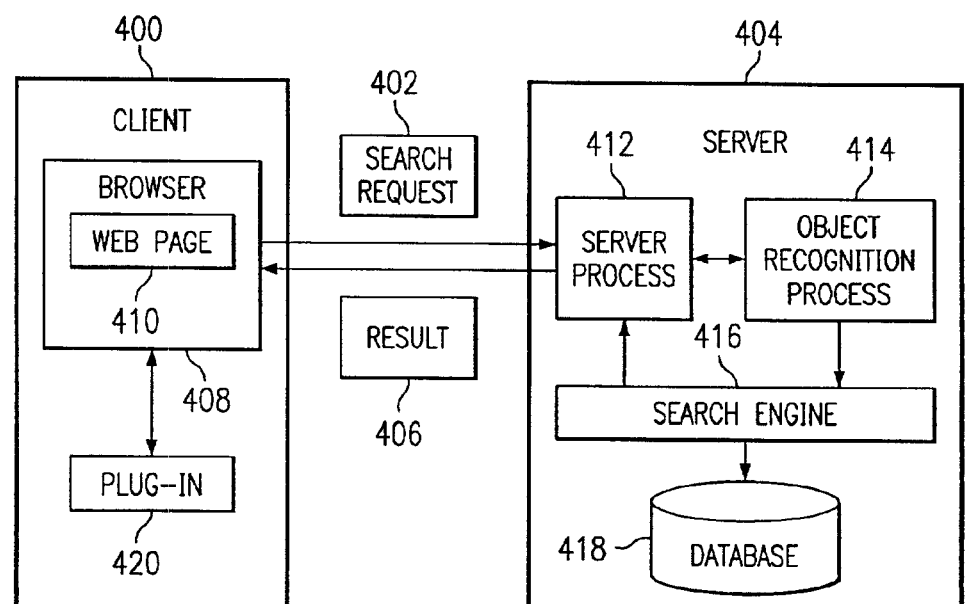
FIG. 4 is a diagram illustrating components used in generating and performing a search in accordance with a preferred embodiment of the present invention.

Turning next to FIG. 4, a diagram illustrating components used in generating and performing a search is depicted in accordance with a preferred embodiment of the present invention. In this example, client 400 sends search request 402 to server 404 and receives result 406. Client 400 may be implemented as data processing system 300 in FIG. 3, while server 404 may be implemented using data processing system 200 in FIG. 2.

In this particular example, browser 408 is an application executing on client 400. Web page 410 is currently displayed in browser 408. When the user selects any image on Web page 410, the image may be used as the basis of a search. This image may be used regardless of whether this image is associated or linked to a uniform resource locator (URL). Additionally, other contextual information associated with the image may be sent to the server with the image. Alternatively, this information may be sent in place of the image. This information is sent in search request 402, which is received by server process 412 in server 404.

Server process 412 processes search request 402 and sends the image to object recognition process 414. This component is used to generate the text description of the image. Various object recognition processes may be used to implement object recognition process 414. Object recognition process 414 may recognize either two-dimensional or three-dimensional shapes. For example, a database of key features may be used to identify an object. The image may be processed to generate a model, such as a wireframe model for use in the analysis. With this model, different components may be identified with these components being used in a comparison to features in the database.

The image also may be divided into different contextual regions having distinctive key features or fragments. In this scheme, a fundamental component is the use of distinctive local features called "keys". A key is any extractable part or feature that has sufficient information content to specify a configuration of an associated object plus some pose-insensitive parameters for use in indexing into a database of keys for different objects.

These and other well-known object recognition processes may be implemented in object recognition process 414 depending on the particular implementation. The result of the process is a text description of the image.

This text description is sent to search engine 416, which performs a search using database 418 to identify sources of information related to the text description. Database 418 contains mappings to different Web pages or other types of content that may be searched based on the text description. These mappings may be static or may change over time. Search engine 416 may be implemented using various well-known search engines. Some search engines, which may be used, include, for example, AltaVista, Google, and HotBot. Depending on the particular implementation, search engine 416 may be located on a different data processing system than server process 412 and object recognition process 414.

The results of this search are sent to server process 412 for return to client 400 in result 406. Result 406 may be, for example, a particular Web page containing the information related to the text description or a Web page containing links to Web pages satisfying the search criteria.

Alternatively, the image itself may be used to perform an image search for resources, such as Web pages, containing identical or similar images to that received in the request. Further, text or other contextual information may be used to search for resources along with the image in such a search.

The processes used to provide this feature in client 400 may be integrated directly in browser 408 or may be provided as a separate software component, such as plug-in 420. The process may be initiated through a particular user input, such as a right mouse click with the pointer or cursor being located over the image of interest.

Figure 5:
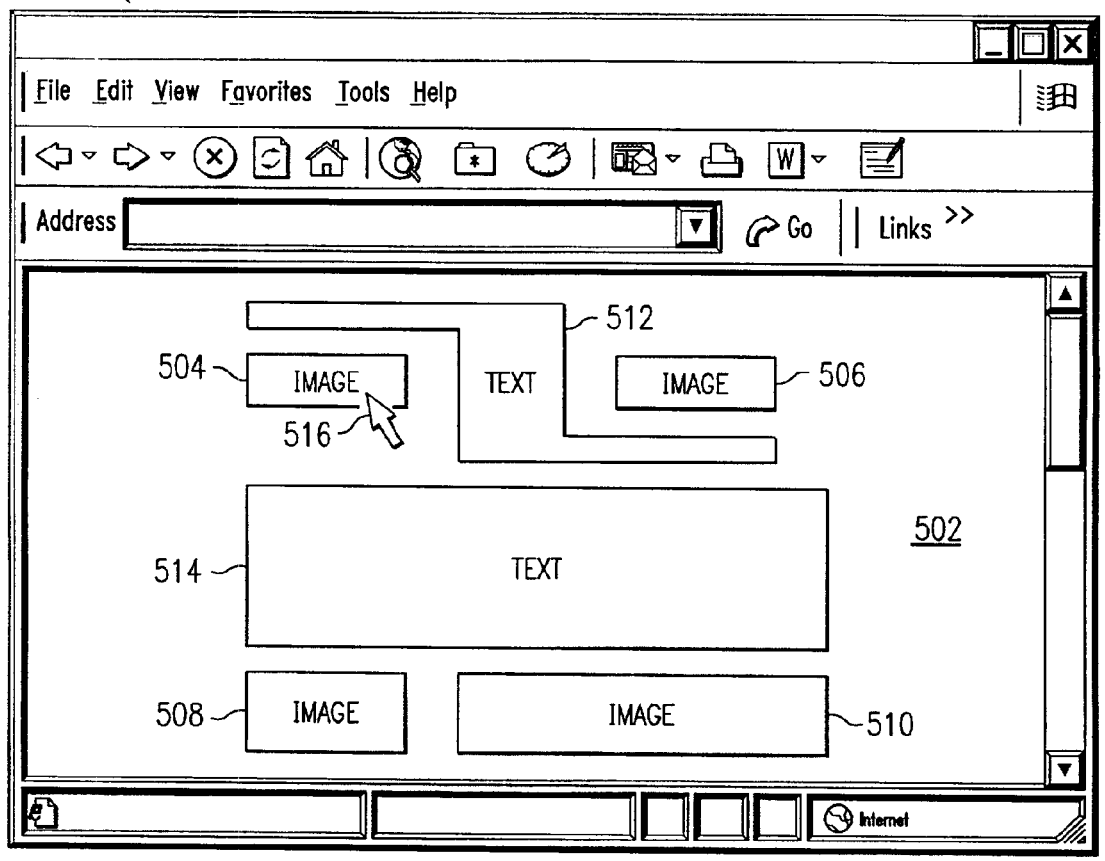
FIG. 5 is a diagram of a Web page in accordance with a preferred embodiment of the present invention.

With reference next to FIG. 5, a diagram of a Web page is depicted in accordance with a preferred embodiment of the present invention. In this example, browser 500 may be implemented using a browser, such as browser 408 in FIG. 4. Web page 502 is an example of a page containing text and images, which may be processed using the mechanism of the present invention. In this example, Web page 502 includes images 504, 506, 508, and 510. Additionally, Web page 502 also includes text regions 512 and 514. When the user selects any image on Web page 502, this image and/or information associated with the image may be sent as a search. This process may operate even if the image is linked to a specific URL.

For example, if image 504 is a picture of a mountain lake, the user moves pointer 516 over image 504, and right clicks, this image may be sent as a search request. In these examples, pointer 516 is controlled using a pointing device, such as a mouse. Of course, other types of pointing devices may be used depending on the particular implementation. These other pointing devices may include, for example, a touchpad, a light pen, a trackball, or the like.

As a response to this selection, the user may be directed to a Web site or a Web page containing vacation spots that have a mountain lake similar to that shown in the picture. This type of search may be performed based on the image alone, based on information associated with the image, or based on both the image and information associated with the image.

Figure 6:
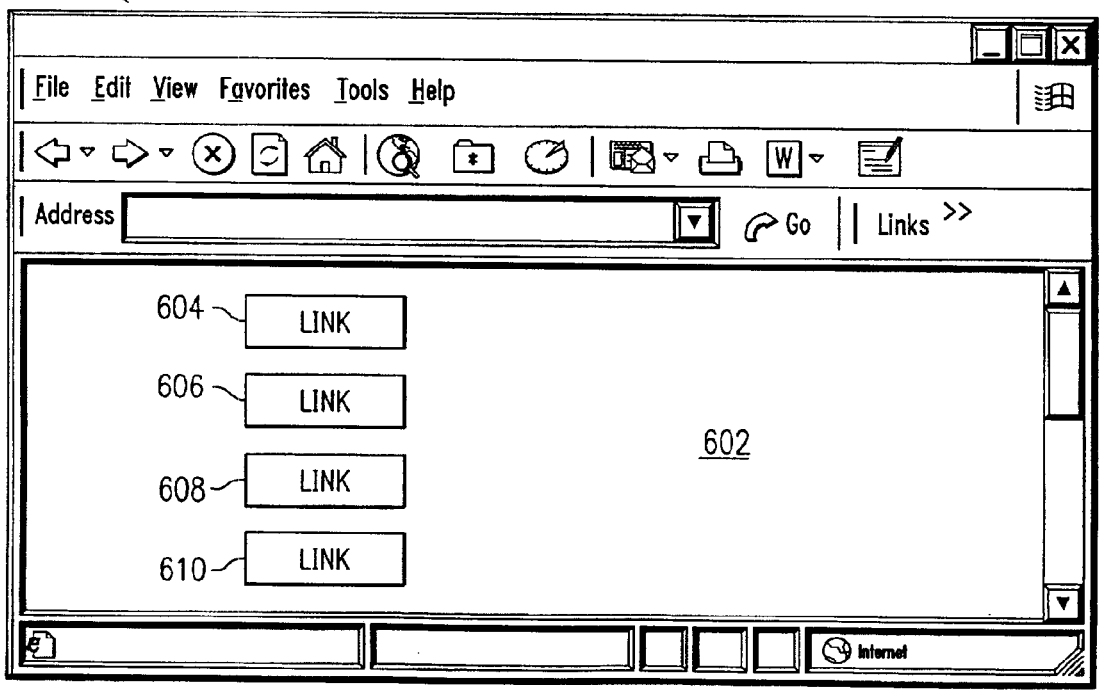
FIG. 6 is a diagram of a set of results in accordance with a preferred embodiment of the present invention.

Turning now to FIG. 6, a diagram of a set of results is depicted in accordance with a preferred embodiment of the present invention. In this example, browser 600 may be implemented using browser 408 in FIG. 4. In this particular case, Web page 602 is a Web page containing results from a search initiated in response to a selection of an image, such as image 504 in FIG. 5. In this example, Web page 602 contains links 604, 606, 608, and 610.

If the image was that of a mountain lake, these links may be links to Web pages giving information, for example, on mountain lakes, vacation spots containing a similar mountain lake, or on activities that may be performed on a mountain lake. Of course, depending on the particular implementation, the user may be directed towards a particular Web site containing information from the search.

Turning now to FIG. 7, a diagram of contextual information associated with an image is depicted in accordance with a preferred embodiment of the present invention. In this example, line 700 is a line from a Web page, such as Web page 502 in FIG. 5. Section 702 describes the image that is presented on the Web page while section 704 is an ALT tag containing contextual information. Additionally, other types of tags, such as meta tags may be used in section 704. In this example, section 702 points to an image of a cruise ship while section 704 provides the following text description, "cruise Caribbean".

A selection of the image may result in the text description forming the contextual information in section 704 being sent for use in initiating a search. This information may be sent alone or along with the image itself. Of course, other contextual information may be used other than ALT tags. For example, one or more meta tags associated with the image may be used. This search may be initiated without requiring the image itself to be linked to a specific URL. Further, this search may be initiated even if the image is linked to a URL.

With reference now to FIG. 8, a flowchart of a process used to generate a search request is depicted in accordance with a preferred embodiment of the present invention. The process illustrated in FIG. 8 may be implemented in browser, such as browser 408 in FIG. 4. Alternatively, this process may be implemented as a software component for use with a browser such as plug-in 420 in FIG. 4.

The process begins by waiting to detect a user input (step 800). A determination is made as to whether the user input is a right click (step 802). If the user has right clicked, a determination is made as to whether the pointer is on the image (step 804). If the pointer is on the image, a determination is made as to whether ALT tag information associated with the image is present (step 806). Depending on the particular implementation, a different type of tag may be used in place of an ALT tag. For example, a meta tag may be used to contain information about the image. If ALT tag information is present, this information is sent to the search engine (step 808) and the process terminates thereafter.

Returning to step 806, if ALT tag information is not present, the image is sent to the search engine (step 810) and the process terminates thereafter. With reference again to step 804, if the pointer is not on the image, the user input is processed (step 812) and the process returns to step 800 as described above. Step 812 is used to process the user input differently if the pointer is located elsewhere. Referring again to step 802, if the user input is not a right click, the user input is processed (step 812) and the process returns to step 800 as described above.

In the process illustrated in FIG. 8, the image is not sent to the search engine if ALT tag information is present. Depending on the implementation, the image also may be sent along with the ALT tag information. Further, other types of contextual information, such as meta tags associated with the image, may be used. Additionally, the process illustrated in FIG. 8 may also send the image to the search engine if a user mistakenly selects the image as if the image is associated with a link or URL. The search engine may perform image analysis, transformation, or other recognition functions and may augment this analysis with other textual or contextual information to find matching resources, such as Web pages.

Turning next to FIG. 9, a flowchart of a process used to generate search results is depicted in accordance with a preferred embodiment of the present invention. The process illustrated in FIG. 9 may be implemented in a server, such as server 404 in FIG. 4. Specifically, the different steps illustrated in FIG. 9 may be performed by different components in FIG. 4, such as server process 412, object recognition process 414, and search engine 416.

The process begins by receiving a request for a search from the requester (step 900). A determination is made as to whether an image or text is present in the request (step 902). If an image is present, object recognition is performed to generate a text description (step 904). A search is performed using the text description (step 906). The results are returned to the requester (step 908) and the process terminates thereafter. In this example, the results are returned as a Web page containing a set of links, such as Web page 602 in FIG. 6.

Returning again to step 902, if text is present, the process proceeds to step 906 as described above. Alternatively, if text is present along with an image, both the text and the text description generated from performing object recognition on the image may be used to perform the search.

Figure 10:
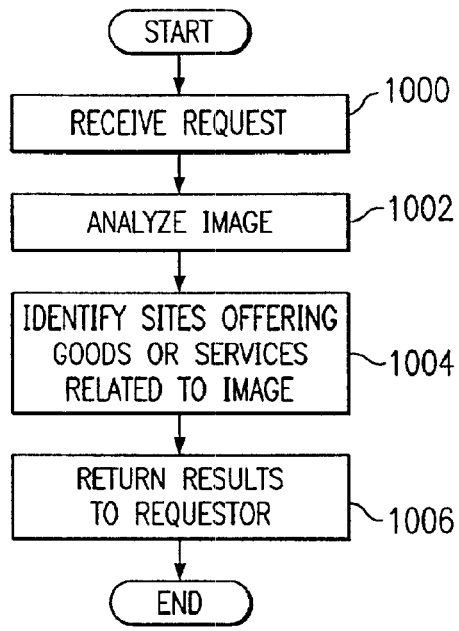
FIG. 10 is a flowchart of a process for identifying goods or services based on the selection of an image in accordance with a preferred embodiment of the present invention.

Turning now to FIG. 10, a flowchart of a process for identifying goods or services based on the selection (mistaken or otherwise) of an image is depicted in accordance with a preferred embodiment of the present invention. The process illustrated in FIG. 10 may be implemented in a server, such as server 404 in FIG. 4. Specifically, this process may be used as a business service to aid users in identifying sources of goods and services.

The process begins by receiving a request (step 1000). This request includes an image sent by a browser in response to a process, such as the one illustrated in FIG. 8. The image is then analyzed (step 1002). The analysis performed depends on the particular implementation. For example, if the image received is that of a suitcase, the image may be analyzed to identify dimensions and a color of the suitcase. Alternatively, this information may be included in the request as ALT tag information. Sites offering the goods or services related to the image are identified (step 1004). The server may charge the merchant or business for the advertising or redirection service. For example, with a suitcase, different sites selling suitcases having similar dimensions and color may be identified. This identification may be made through a database maintained by the server or by the server initiating a search.

The different sites identified are then returned to the requestor (step 1006) with the process terminating thereafter. The results returned may take the form of a Web page with links to the various sites identified. Alternatively, if a single site is identified, the result may be a redirection of the browser to the identified site.

Figure 11:
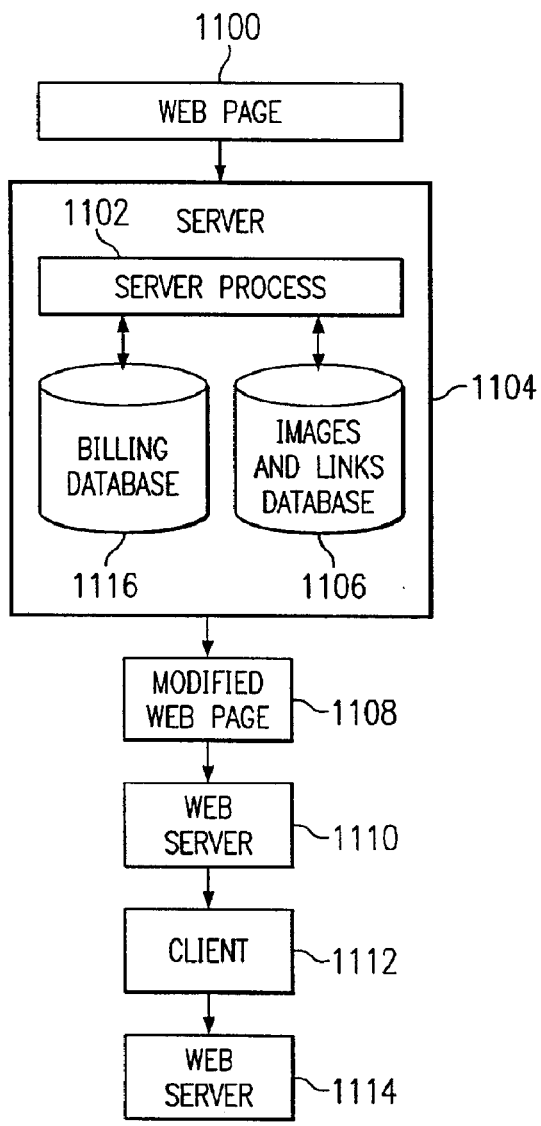
FIG. 11 is a diagram illustrating analysis of images in accordance with a preferred embodiment of the present invention.

Turning now to FIG. 11, a diagram illustrating analysis of images is depicted in accordance with a preferred embodiment of the present invention. The developer of a Web page may submit one or more pages, such as Web page 1100 to server process 1102 in server 1104 for analysis. Server process 1102 identifies images on Web page 1100 and searches images and links database 1106 to determine whether similar images are present. Images and links database 1106 may contain images provided by various businesses or other organizations as well as links to their Web sites. Any similar images to the ones on Web page 1100 may be used to replace those images on Web page 1100 to form modified Web page 1108. This modified Web page is then sent to Web server 1110, which is a server for the Web site on which modified Web page 1108 is located. In response to a request from client 1112, modified Web page 1108 is sent to client 1112 in which this modified Web page contains images and links to Web sites of businesses identified by server process 1102. As a result, a user selecting an image on modified Web page 1108 may be redirected to a Web server containing the Web site for the business, such as Web server 1114. Alternatively, instead of a link, information, such as ALT tag information, may be used in which the ALT tag information causes the returned result to be a link to Web server 1114.

The different businesses or organizations desiring to promote their goods and services on the Web may pay a fee for the inclusion of their images and links in Web pages. Web developers or others generating Web pages may receive payment for including these types of images and links on their Web pages. Such payments may be tracked in billing database 1116 in server 1104.

For example, Web page 1100 may include an image of a mountain. Server process 1102 may identify a similar image in images and links database 1106 in which this image is one provided by a travel agency. This image may be one used in association with a travel package to ski in the Alps. Web page 1100 is modified to include the image provided by the travel agency as well as a link or ALT tag information that causes the user to be directed to the travel agency's Web site.

Thus, the present invention provides an improved method, apparatus, and computer implemented instructions for performing searches based on a selection of an image. Object recognition is performed on an image to generate a text description for use in a search. Alternatively, other contextual information associated with the image may be used in addition to or in place of the image. In this manner, the user who is unable to think of the appropriate words for a search may use an image as the basis of the search.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disk, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. For example, the meta tag and ALT tag information may be present in the Web page as stored. Alternatively, this information may be associated with the image on a dynamic basis as the page is retrieved or generated in response to a user request for the page. In this manner, information such as that found in section 704 of line 700 in FIG. 7 may be dynamically associated with the image. This would allow for the contextual information for the image to change. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for processing a user input comprising:

detecting a user input selecting an image on a page;

sending the image to a server to perform a search in response to detecting the user input;

receiving a result of the search in response to sending the image to the server to form a received result;

displaying the received result;

further comprising:

determining whether the image has tag information;

responsive to an ALT tag being present, sending the tag information to the server to perform the search;

wherein the tag information is sent instead of the image; and wherein the tag information includes at least one of ALT tag information and meta tag information.

2. The method of claim 1, wherein the result is a Web page.

3. The method of claim 2, wherein the Web page contains links to Web pages having a subject matter related to the image.

4. The method of claim 1, wherein the step of sending the image to the server includes sending other information associated with the image.

5. The method of claim 4, wherein the other information is contextual information about the image.

6. The method of claim 5, wherein the contextual information includes at least one of ALT tag information and meta tag information.

7. The method of claim 1, wherein the search includes at least one of matching the image with images contained in Web pages and performing object recognition to generate text used to search for Web pages.

8. A data processing system for processing a user input, the data processing system comprising:

a bus system;

a communications unit connected to the bus system; a memory connected to the bus system, wherein the memory includes a set of instructions; and a processing unit connected to the bus system, wherein the processing unit executes the set of instructions to detect a user input selecting an image on a page; send the image to a server to perform a search in response to detecting the user input; receive a result of the search in response to sending the image to the server to form a received result; displaying the received result;

displaying the received result;

further comprising:

determining whether the image has tag information;

responsive to an ALT tag being present, sending the tag information to the server to perform the search;

wherein the tag information is sent instead of the image; and wherein the tag information includes at least one of ALT tag information and meta tag information.

9. A data processing system for processing a user input comprising:

detecting means for detecting a user input selecting an image on a page;

sending means for sending the image to a server to perform a search in response to detecting the user input;

receiving means for receiving a result of the search in response to sending the image to the server to form a received result;

displaying means for displaying the received result;

wherein the sending means is a first sending means and further comprising:

determining means for determining whether the image has tag information;

second sending means, responsive to an ALT tag being present, for sending the tag information to the server to perform the search;

wherein the tag information is sent instead of the image; and wherein the tag information includes at least one of ALT tag information and meta tag information.

10. The data processing system of claim 9, wherein the result is a Web page.

11. The data processing system of claim 10, wherein the Web page contains links to Web pages having a subject matter related to the image.

12. The data processing system of claim 9, wherein the means of sending the image to the server includes sending other information associated with the image.

13. The data processing system of claim 12, wherein the other information is contextual information about the image.

14. The data processing system of claim 13, wherein the contextual information includes at least one of ALT tag information and meta tag information.

15. The data processing system of claim 9, wherein the search includes at least one of matching the image with images contained in Web pages and performing object recognition to generate text used to search for Web pages.

16. A computer program product in a computer readable medium for processing a user input, the computer program product comprising:

first instructions for detecting a user input selecting an image on a page;

second instructions for sending the image to a server to perform a search in response to detecting the user input;

third instructions for receiving a result of the search in response to sending the image to the server to form a received result;

fourth instructions for displaying the received result;

wherein the sending is a first sending and further comprising:

determining whether the image has tag information;

second sending, responsive to an ALT tag being present, for sending the tag information to the server to perform the search;

wherein the tag information is sent instead of the image; and wherein the tag information includes at least one of ALT tag information and meta tag information.

* * * * *

UNITED STATES PATENT AND TRADEMARK OFFICE
CERTIFICATE OF CORRECTION

PATENT NO. : 7,076,498 B2 Page 1 of 1
APPLICATION NO. : 10/165875
DATED : July 11, 2006
INVENTOR(S) : Banerjee et al.

It is certified that error appears in the above-identified patent and that said Letters Patent is hereby corrected as shown below:

On Title page
Item (74) Attorney, Agent, or Firm: delete "Duke W. Lee" and insert --Duke W. Yee--.

Signed and Sealed this

Third Day of October, 2006

JON W. DUDAS
*Director of the United States Patent and Trademark Office*